(12) United States Patent
Yamakita

(10) Patent No.: US 9,703,518 B2
(45) Date of Patent: Jul. 11, 2017

(54) MOBILE TERMINAL, DISPLAY CONTROL METHOD, AND PROGRAM

(71) Applicant: NEC CASIO MOBILE COMMUNICATIONS, LTD., Kawasaki-shi, Kanagawa (JP)

(72) Inventor: Takahiro Yamakita, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/650,910

(22) PCT Filed: Jul. 23, 2013

(86) PCT No.: PCT/JP2013/004465
§ 371 (c)(1),
(2) Date: Jun. 10, 2015

(87) PCT Pub. No.: WO2014/097505
PCT Pub. Date: Jun. 26, 2014

(65) Prior Publication Data
US 2015/0309764 A1    Oct. 29, 2015

(30) Foreign Application Priority Data

Dec. 19, 2012    (JP) ................................ 2012-276606

(51) Int. Cl.
*G06F 3/14*       (2006.01)
*G09G 5/00*       (2006.01)
(Continued)

(52) U.S. Cl.
CPC .......... *G06F 3/1446* (2013.01); *G06F 3/0481* (2013.01); *G06F 3/1431* (2013.01);
(Continued)

(58) Field of Classification Search
None
See application file for complete search history.

(56) References Cited

U.S. PATENT DOCUMENTS

| 2010/0033402 A1 | 2/2010 | Yoshida et al. |
| 2011/0109526 A1 | 5/2011 | Bauza et al. |

(Continued)

FOREIGN PATENT DOCUMENTS

| CN | 102597941 A | 7/2012 |
| JP | 04-248616 A | 9/1992 |

(Continued)

OTHER PUBLICATIONS

English machine translation of japanese patent publication JP 2009-042356A.*

(Continued)

*Primary Examiner* — Nicholas Lee

(57) ABSTRACT

A mobile terminal provided with a plurality of display devices arranged such that frame parts surrounding display screens come in contact with each other and an image control section which switchably executes (i) a normal display mode where one display image is divided into display images according to the respective sizes of the display screens of the plurality of display devices and displayed on the plurality of display devices, and (ii) a complementary display mode where one display image is divided into display images according to the respective sizes of the display screens of the plurality of display devices with an image corresponding to a non-display portion formed by skipping the frame parts and displayed on the plurality of display devices. Accordingly, a sense of incongruity due to discontinuity of a displayed image by frame parts can be reduced and a lack of display information can be prevented.

4 Claims, 12 Drawing Sheets

(51) Int. Cl.
  G09G 5/38      (2006.01)
  G06F 3/0481    (2013.01)

(52) U.S. Cl.
  CPC ............ *G06F 3/1438* (2013.01); *G09G 5/00* (2013.01); *G09G 5/005* (2013.01); *G09G 5/38* (2013.01); *G06F 2203/04803* (2013.01); *G09G 2300/026* (2013.01); *G09G 2356/00* (2013.01); *H04M 2250/16* (2013.01)

(56) References Cited

U.S. PATENT DOCUMENTS

| | | | |
|---|---|---|---|
| 2012/0218216 A1* | 8/2012 | Tomimori | G06F 3/0483 345/173 |
| 2012/0249601 A1 | 10/2012 | Kawashimo et al. | |

FOREIGN PATENT DOCUMENTS

| | | |
|---|---|---|
| JP | 2002-006822 A | 1/2002 |
| JP | 2006-319509 A | 11/2006 |
| JP | 2007-124025 A | 5/2007 |
| JP | 2009-042356 A | 2/2009 |
| JP | 2010-039445 A | 2/2010 |
| JP | 2012-048035 A | 3/2012 |
| JP | 2012-133068 A | 7/2012 |
| JP | 2012-212001 A | 11/2012 |
| JP | 2013-510342 A | 3/2013 |
| JP | 2003-280623 A | 10/2013 |
| WO | 2010/028397 A1 | 3/2010 |
| WO | 2011/057271 A1 | 5/2011 |

OTHER PUBLICATIONS

International Search Report for PCT Application No. PCT/JP2013/004465, mailed on Oct. 29, 2013.
"Matrox Monitor Bezel Management" TripleHead2Go Digital Edition, Matrox, Jun. 5, 2008, pp. 0-7 from the Internet: http://www.matrox.com/graphics/surroundgaming/media/en/pdf/Matrox_Monitor_Bezel_Management_White_Paper.pdf.
Extended European Search Report for EP Application No. EP138657931 dated on Jul. 11, 2016.
Japanese Office Action for JP Application No. 2014-552878 mailed on Feb. 9, 2017 with English Translation.
Chinese Office Action for CN Application No. 201380067283.5 dated on Feb. 13, 2017 with English Translation.

* cited by examiner (a)

PRIOR ART

MOBILE TERMINAL, DISPLAY CONTROL METHOD, AND PROGRAM

This is a National Stage Entry of PCT/JP2013/004465 filed Jul. 23, 2013, which claims priority from Japanese Patent Application 2012-276606 filed on Dec. 19, 2012, the contents of which are incorporated herein by reference, in their entirety.

TECHNICAL FIELD

The present invention relates to a mobile terminal, a display control method, and a program.

BACKGROUND ART

A technique is known in which, in order to display information on a large screen in a mobile terminal, two or more display devices are aligned to forma large screen, and a large one-sheet picture is displayed using the large screen. In such a mobile terminal, because the horizontally aligned display devices have frame parts, the display screens are apart from each other by the frame parts.

FIGS. 11(a) and (b) are schematic diagrams showing an example where a large one-sheet picture is displayed on two display devices. For example, when the large one-sheet picture 100 shown in FIG. 11 (a) is simply divided into two parts and displayed as shown in FIG. 11 (b), because the two display devices 110 and 111 are separated by the frame parts, a diagonal line therein does not look like one line as shown by the dashed circle 120, resulting in a sense of incongruity. As another example, when a person's face is divided and displayed continuously, a sense of incongruity will occur. In addition, when a circle is divided into left and right halves, the circle is displayed as semicircles and looks like an ellipse.

For example, in Patent Document 1, a technique has been proposed in which a main display device is placed in the center and, when two sliding display devices are drawn toward the left and right sides by being slid, one large screen is formed by a total of three display devices. In Patent Document 1, when a large one-sheet picture is to be displayed on the large screen, partial images to be displayed on the respective display devices are generated from the one-sheet picture such that portions hidden by the frame parts are eliminated, and then displayed on the respective display devices.

PRIOR ART DOCUMENT

Patent Document

Patent Document 1: JP 2007-124025

SUMMARY OF INVENTION

Problem to be Solved by the Invention

In the above-described Patent Document 1, when a large one-sheet picture is to be displayed on the large screen, partial images to be displayed on the respective display devices are cut out from the one-sheet picture such that portions hidden by the frame parts of the display devices are eliminated. Therefore, there is no sense of incongruity caused by the disconnection of a diagonal line, etc. However, there is a problem in that, since the images for the respective display devices are required to be generated with the portions corresponding to the frames being eliminated, the image processing requires time. In addition, there is another problem in that, in the display of information including both image data and texts, such as a web page, or information constituted by texts, the information is rather hard to see or cannot be properly enjoyed due to the loss of information regarding the portions corresponding to the frames.

Accordingly, an object of the present invention is to provide a mobile terminal, a display control method, and a program, which reduces a sense of incongruity due to discontinuity of a displayed image and prevents a lack of display information.

Means for Solving the Problem

A mobile terminal of the present invention is a mobile terminal comprising: a plurality of display devices which have display screens and frame parts surrounding the display screens and arranged such that the frame parts come in contact with each other; and an image control section which switchably executes (i) a normal display mode where one display image is divided into display images according to respective sizes of the display screens of the plurality of display devices, the display images acquired by division are transferred to the plurality of display devices, respectively, and the one display image is displayed on the display screens of the plurality of display devices, and (ii) a complementary display mode where one display image is divided into display images according to the respective sizes of the display screens of the plurality of display devices with an image corresponding to a non-display portion formed by skipping the frame parts, the display images acquired by division are transferred to the plurality of display devices, respectively, and the one display image is displayed on the display screens of the plurality of display devices.

A display control method of the present invention is a display control method for displaying one display image on a display screen constituted by a plurality of display devices having display screens and frame parts surrounding the display screens and arranged such that the frame parts come in contact with each other, comprising: a normal display mode step of dividing one display image into display images according to respective sizes of the display screens of the plurality of display devices, transferring the display images acquired by division to the plurality of display devices, respectively, and displaying the one display image on the display screens of the plurality of display devices; a complementary display mode step of dividing one display image into display images according to the respective sizes of the display screens of the plurality of display devices with an image corresponding to a non-display portion formed by skipping the frame parts, and transferring the display images acquired by division to the plurality of display devices, respectively, and displaying the one display image on the display screens of the plurality of display devices; and a step of selectively switching between the normal display mode step and the complementary display mode step.

A program of the present invention is characterized by a non-transitory computer-readable storage medium having a program stored thereon that is executable by a processor in a mobile terminal which displays one display image on a display screen constituted by a plurality of display devices having display screens and frame parts surrounding the display screens and arranged such that the frame parts come in contact with each other, the program being executable to cause the mobile terminal to actualize functions comprising:

a normal display mode function of dividing one display image into display images according to respective sizes of the display screens of the plurality of display devices, transferring the display images acquired by division to the plurality of display devices, respectively, and displaying the one display image on the display screens of the plurality of display devices; a complementary display mode function of dividing one display image into display images according to the respective sizes of the display screens of the plurality of display devices with an image corresponding to a non-display portion formed by skipping the frame parts, transferring the display images acquired by division to the plurality of display devices, respectively, and displaying the one display image on the display screens of the plurality of display devices; and a function of selectively switching between the normal display mode function and the complementary display mode function.

Effect of the Invention

According to the present invention, a sense of incongruity due to discontinuity of a displayed image by frame parts can be reduced and a lack of display information can be prevented.

DESCRIPTION OF EMBODIMENTS

Hereinafter, embodiments of the present invention will be described with reference to the drawings.

A. First Embodiment

Figure 1:
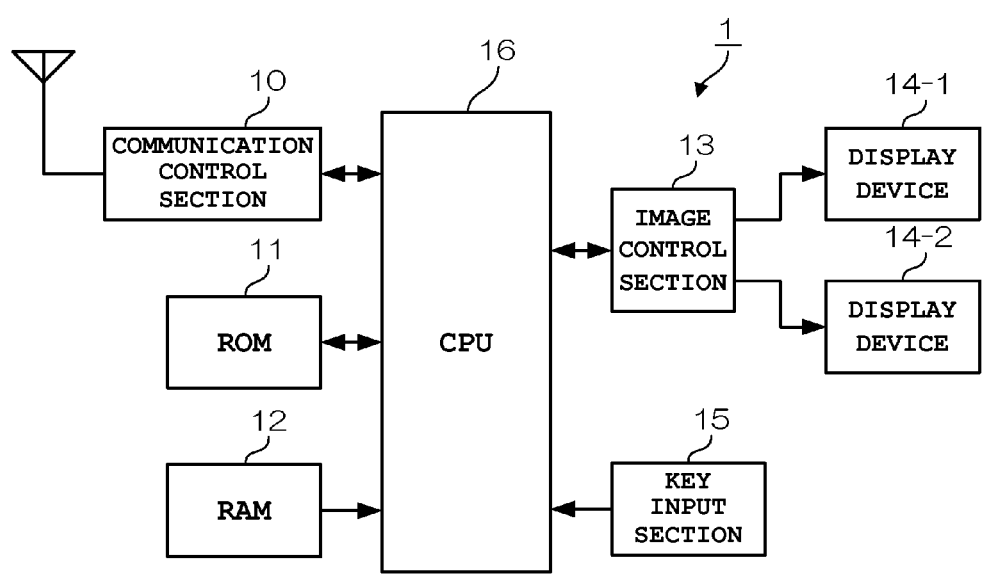
FIG. 1 is a block diagram showing the structure of a mobile terminal 1 according to a first embodiment of the present invention.

FIG. 1 is a block diagram showing the structure of a mobile terminal 1 according to a first embodiment of the present invention. In FIG. 1, the mobile terminal 1 is constituted by a communication control section 10, a ROM 11, a RAM 12, an image control section 13, display devices 14-1 and 14-2, a key input section 15, and a CPU 16. The communication control section 10 performs audio communication and data communication under the control of the CPU 16 described below. The ROM 11 stores programs to be executed by the CPU 16 described below, various parameters required to execute the programs, etc. The RAM 12 stores various data generated along with the execution of a program by the CPU 16, data to be stored temporarily, rewritable data, etc. Note that the ROM 11 and RAM 12 may be a rewritable nonvolatile memory, such as a flash memory.

The image control section 13 generates a display image to be displayed on the display devices 14-1 and 14-2 under the control of the CPU 16 described below, and transfers the image to the display devices 14-1 and 14-2. The display devices 14-1 and 14-2 are the same in size and resolution, and used by being aligned. The display devices 14-1 and 14-2 each display a display image provided from the image control section 13. Note that display images in this embodiment are not limited to image data, and may be information including both image data and texts, such as a web page, and information consisting of texts. The key input section 15 is constituted by an electric power switch, a ten key, an alphabet key, etc.

The CPU 16 executes a predetermined program stored in the ROM 11 and controls the operation of each section. Although details will be described later, the first embodiment is provided with a normal display mode and a complementary display mode as modes for displaying a one-sheet display image on the display devices 14-1 and 14-2. In the normal display mode, a one-sheet display image is divided into two parts such as a left display part and a right display part, and displayed on the display devices 14-1 and 14-2 as they are, respectively. In the complementary display mode, the left display part and the right display part of a one-sheet display image excluding the frame parts of the display devices 14-1 and 14-2 (non-display portion) are displayed on the display devices 14-1 and 14-2 as they are, respectively. Whether display is performed in the normal display mode or the complementary display mode can be selected by the user, and the CPU 16 gives an instruction regarding the display mode selected by the user to the image control section 13. Then, as instructed by the CPU 16, the image control section 13 generates display images in accordance with the display method of the normal display mode or the complementary display mode, and transfers the images to the display devices 14-1 and 14-2, respectively.

Figure 2:
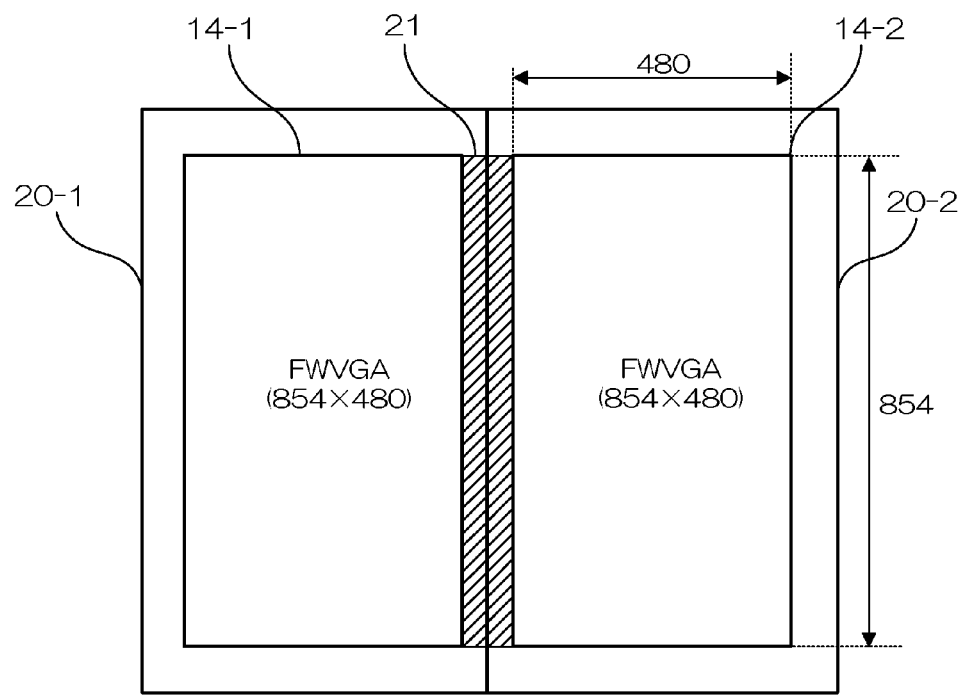
FIG. 2 is a schematic diagram showing the external appearance of the mobile terminal 1 of the first embodiment.

FIG. 2 is a schematic diagram showing the external appearance of the mobile terminal 1 of the first embodiment. The mobile terminal 1 in FIG. 2 is structured to have, for example, a hinge mechanism in the center, two housings 20-1 and 20-2 on the left and right sides of the hinge mechanism, and display devices 14-1 and 14-2 respectively provided in the housings 20-1 and 20-2. FIG. 2 shows a state where the left and right housings 20-1 and 20-2 have been opened with the hinge mechanism being in the center. The display devices 14-1 and 14-2 each have the FWVGA screen size (854×480 dots). Also, the left and right housings 20-1 and 20-2 each have a frame part surrounding the display devices 14-1 and 14-2, respectively. As a result, even in the state where the left and right housings 20-1 and 20-2 are opened, a non-display portion 21 is formed by each frame part between the display device 14-1 and the display device 14-2.

Figure 3:
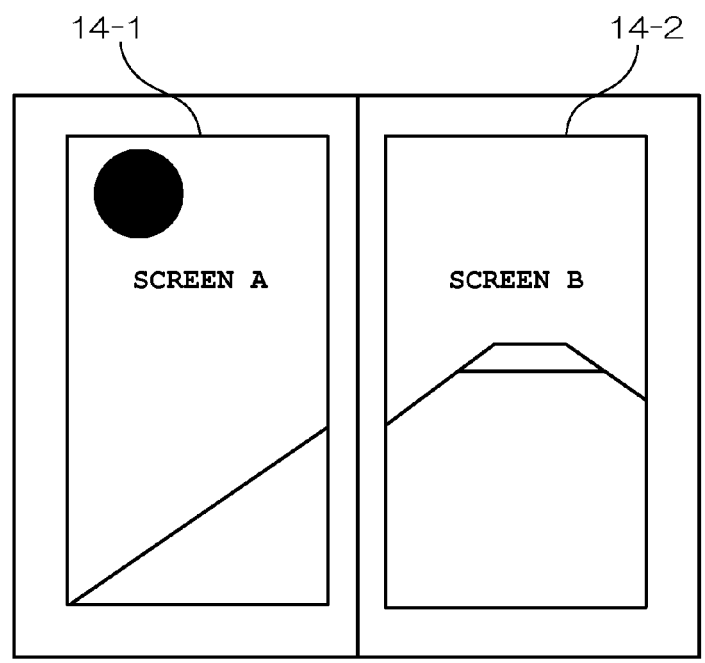
FIG. 3 is a schematic diagram showing a display example in a normal display mode according to the first embodiment.

FIG. 3 is a schematic diagram showing a display example in the normal display mode according to the first embodiment. In a case where two display screens are used in the normal display mode, a large one-sheet picture is divided into two parts such as a left display part and a right display part, and they are respectively displayed on the display devices 14-1 and 14-2 as they are, as described above. In this case, the one-sheet picture is simply divided into the two parts and displayed without the non-display portion 21 formed by the frame parts between the display device 14-1 and the display device 14-2 being taken into consideration. Accordingly, the diagonal line is discontinuous, resulting in a sense of incongruity. However, when information including both image data and texts, such as a web page, or information consisting of texts are to be displayed in the normal display mode, the image is not skipped, and is entirely displayed unlike the complementary display mode described below. Therefore, no information is lost.

Figure 4:
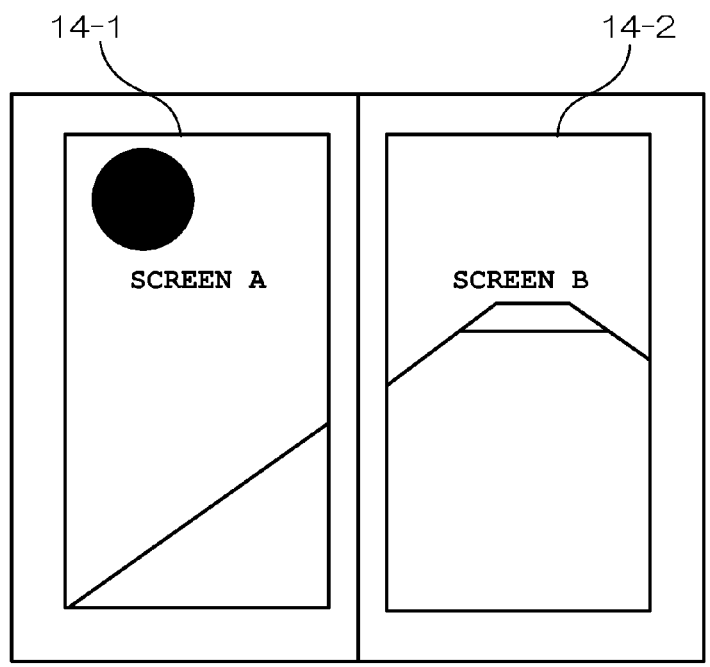
FIG. 4 is a schematic diagram showing a display example in a complementary display mode according to the first embodiment.

FIG. 4 is a schematic diagram showing a display example in the complementary display mode according to the first embodiment. In a case where two display screens are used in the complementary display mode, the non-display portion 21 formed by the frame parts between the display device 14-1 and the display device 14-2 is taken into consideration, so that the non-display portion 21 is skipped and a left display part and a right display part of a large one-sheet picture are displayed on the display devices 14-1 and 14-2, respectively, as described above. In this case, the non-display portion 21 formed by the frame parts between the display device 14-1 and the display device 14-2 is taken into consideration, and accordingly the large one-sheet picture is transferred skipping the non-display portion 21. Therefore, the diagonal line is visually pseudo-complemented and accordingly appears continuous and a sense of incongruity is reduced.

Figure 5:
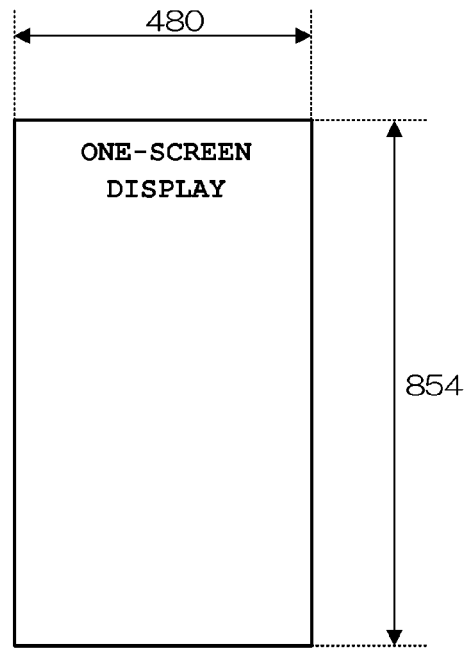
FIGS. 5 (a) and 5 (b) are schematic diagrams showing an example of a display area size in the normal display mode according to the first embodiment.
Figure 5:
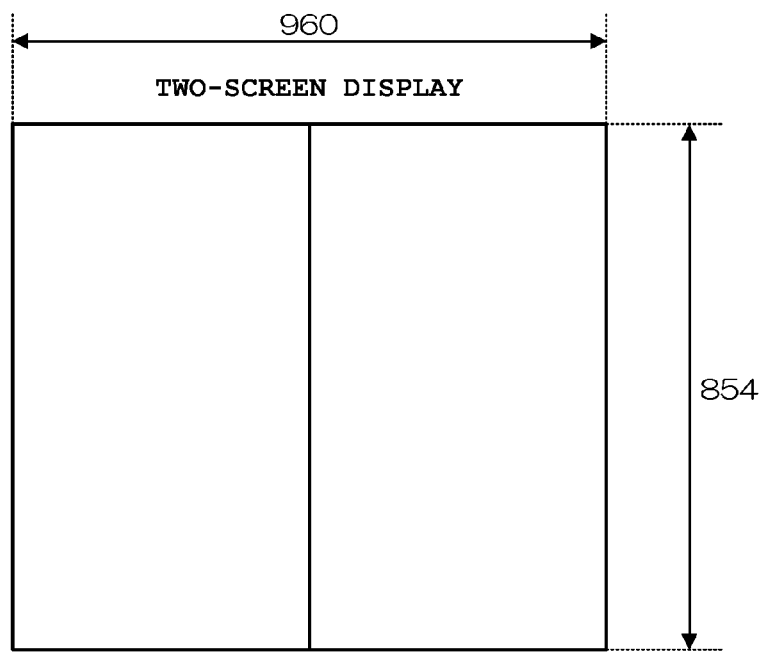

FIGS. 5(a) and 5(b) are schematic diagrams each showing an example of a display area size in the normal display mode according to the first embodiment. In a case where display is performed by one of the display devices 14-1 and 14-2 in the normal display mode, the display area is 854×480 because the screen size of each of the display devices 14-1 and 14-2 is 854×480, as shown in FIG. 5(a). On the other hand, In a case where display is performed across the two display devices 14-1 and 14-2, the display area is 854×960, as shown in a FIG. 5(b). As described above, in the normal display mode, the non-display portion 21 formed by the frame parts between the display device 14-1 and the display device 14-2 is not taken into consideration.

Figure 6:
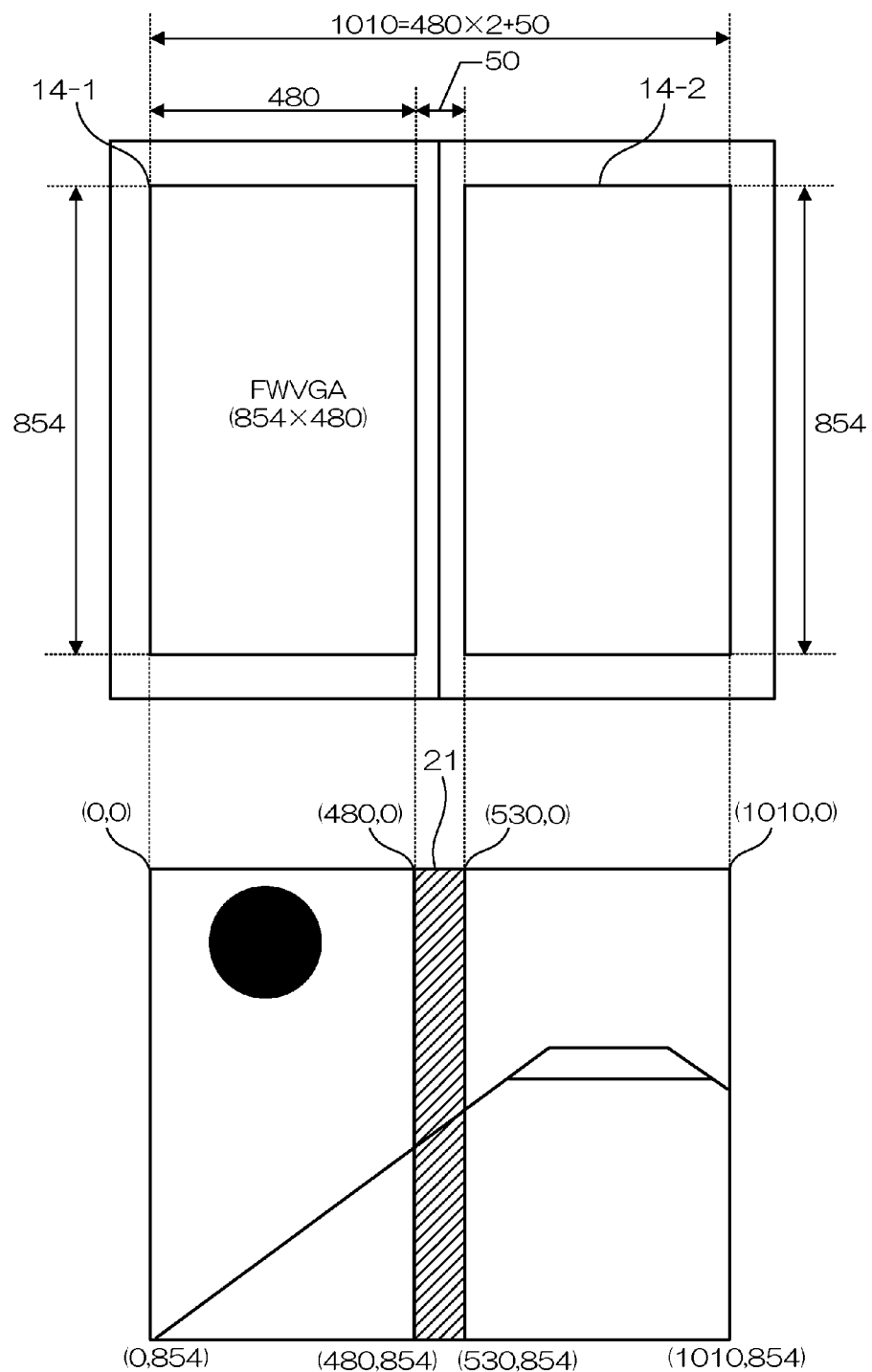
FIG. 6 is a schematic diagram showing an example of a display area size in the complementary display mode according to the first embodiment.

FIG. 6 is a schematic diagram showing an example of a display area size in the complementary display mode according to the first embodiment. In a mobile terminal 1 according to the first embodiment, as shown in the upper part of FIG. 6, the display devices 14-1 and 14-2 each have a screen size of 854×480, and the non-display portion 21, or in other words, the frame parts between the display device 14-1 and the display device 14-2 occupies 50 dots on an image. Therefore, the size of a one-sheet picture that can be displayed on the two screens of the display devices 14-1 and 14-2 including the non-display portion 21 constituted by the frame parts is length×width=854×1010. In a one-sheet picture shown in the lower part of FIG. 6, in the complementary display mode, the shaded non-display portion 21 is equivalent to the frame parts between the display device 14-1 and the display device 14-2, and the part on the left side and the part on the right side excluding the non-display portion 21 are transferred to the display device 14-1 and the display device 14-2, respectively.

Figure 7:
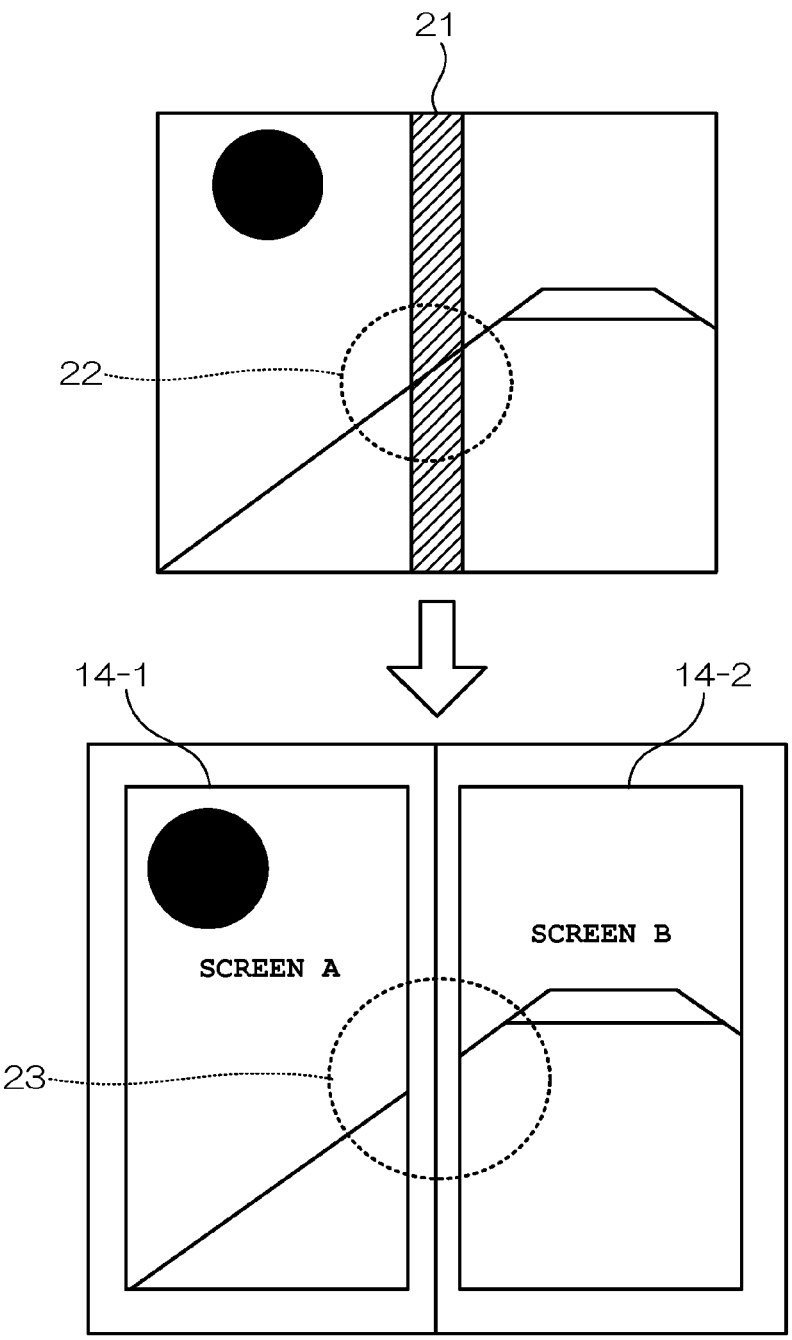
FIG. 7 is a schematic diagram showing a display example in the complementary display mode according to the first embodiment.

FIG. 7 is a schematic diagram showing a display example in the complementary display mode according to the first embodiment. In order to prevent a sense of incongruity, an image is generated on the assumption that there is one large image on two screens+a non-display portion as shown in the upper part of FIG. 7, and parts excluding the shaded non-display portion 21 that is not actually displayed are transferred to the display devices 14-1 and 14-2, respectively, as shown in the lower part of FIG. 7. As a result, the image is visually pseudo-complemented and can be displayed with a reduced sense of incongruity. A dashed circle 22 shown in the upper part of FIG. 7 and a dashed circle 23 shown in the lower part thereof indicate the same spot. By being pseudo-complemented, the so-called diagonal line looks like a straight line and a sense of incongruity is reduced.

Figure 8:
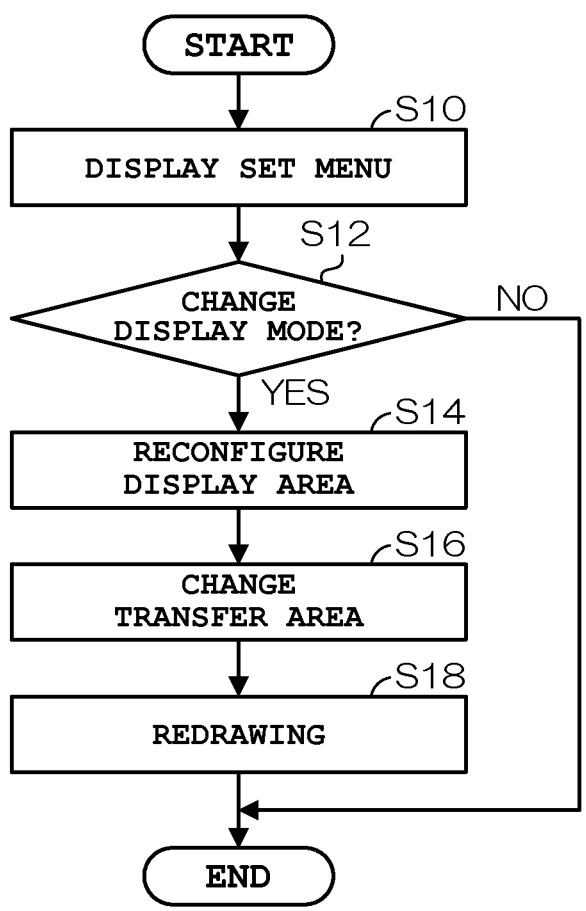
FIG. 8 is a flowchart for explaining an operation of the mobile terminal according to the first embodiment.

FIG. 8 is a flow chart for explaining an operation of the mobile terminal according to the first embodiment. The CPU 16 first displays a set menu (Step S10) and judges whether display mode change has been selected (Step S12). In the first embodiment, the normal display mode (FIG. 3) and the complementary display mode (FIG. 4) are switchable to each other as described above. As a result, whether to display all or to display so that a sense of incongruity in appearance is reduced without a lack of information can be selected based on the contents to be displayed (application). For example, the normal display mode is selected to read letters on an e-mail or a browser, and the complementary display mode is selected for still images, moving images, etc. Then, when display mode change has not been selected (NO of Step S12), the CPU 16 ends the processing. Conversely, when display mode change has been selected (YES of Step S12), the CPU 16 reconfigures the display area (Step S14).

As described above, the size of an image in the normal display mode is [854×960] (see FIG. 5(b)), and the size of an image in the complementary display mode is [854×1010] (see the lower part of FIG. 6). The image in the complementary display mode includes the non-display portion 21 between the display device 14-1 and the display device 14-2 with a size of 50 dots. Therefore, basically, images for these display modes may be prepared by the original images being scaled up or down, trimmed, etc. Alternatively, in the complementary display mode, an image of the size [854×1010] may be prepared and used as it is. In the normal display mode, an image of the size [854×1010] may be cut by 25 dots at each of the left and right ends to prepare an image of [854×960].

When changing the current mode from the normal display mode to the complementary display mode, the CPU 15 changes an image of [854×960] to an image of [854×1010]. Conversely, when changing the current mode from the complementary display mode to the normal display mode, the CPU changes an image of [854×1010] to an image of [854×960]. Next, in accordance with a result of the reconfiguration, the CPU 16 changes a specified position of a transfer source to be transferred to the display device 14-1 and the display device 14-2 (Step S16). Then, in accordance with the specified position of the transfer source from the CPU 16, the image control section 13 transfers the image to the display device 14-1 and the display device 14-2 and redraws the image (Step S18).

Specifically, in the normal display mode, the image control section 13 transfers the left half of an image of [854×960] to the display device 14-1 and transfers the right half to the display device 14-2. As a result, the [854×960] image is simply halved and displayed on the display device 14-1 and the display device 14-2, as shown in FIG. 3. Here, the [854×960] image is entirely displayed without a lack of information.

On the other hand, in the complementary display mode, the image control section 13 skips a part of an image of [854×1010], which is a non-display portion 21 of [(480,0) (530,854)], and transfers an image of [(0,0) (480,854)] to the display device 14-1, and transfers an image of [(530,0) (1010, 854)] to the display device 14-2. As a result, the image of [(0,0) (480,854)] and the image of [(530,0) (1010, 854)] excluding the non-display portion 21 are displayed on the display device 14-1 and the display device 14-2, as shown in FIG. 4. In this case, although the information of the non-display portion 21 is lacking, a sense of incongruity is reduced because the information is visually pseudo-complemented.

In the above-described first embodiment, the normal display mode which displays all information although a sense of incongruity remains and the complementary display mode which reduces a sense of incongruity due to discontinuity of a displayed image by frame parts are prepared. In addition, the normal display mode and the complementary display mode are switchable to each other based on information to be displayed. As a result, a sense of incongruity due to discontinuity of a displayed image by frame parts can be reduced and a lack of display information can be prevented.

Also, in the complementary display mode in the first embodiment, the display screen of each display device is not prepared, and a transfer source is simply changed such that the non-display portion 21 is skipped. Therefore, high-speed processing is possible.

B. Second Embodiment

Next, the second embodiment of the present invention will be described. Note that the structure of the mobile terminal 1 therein is similar to that of the first embodiment, and therefore explanation therefor is omitted.

Figure 9:
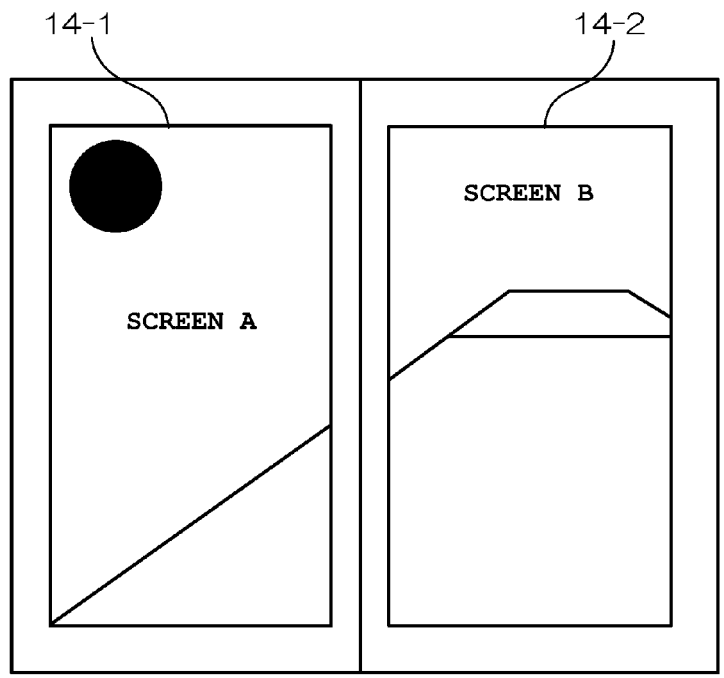
FIGS. 9 (a) and 9 (b) are schematic diagrams for explaining a multi-screen display method (right slide mode) according to a second embodiment.
Figure 9:
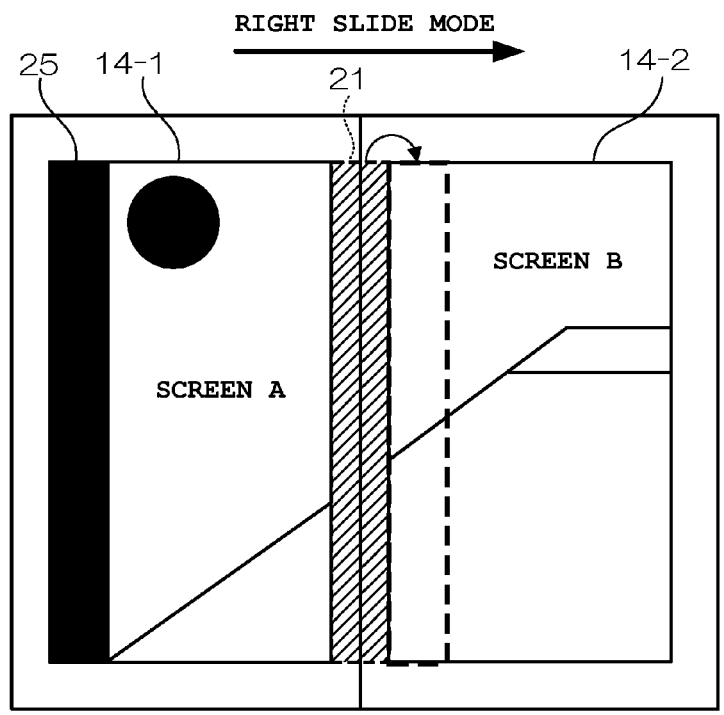

FIGS. 9 (a) and 9 (b) are schematic diagrams for explaining a multi-screen display method (right slide mode) according to the second embodiment. In the complementary display mode according to the above-described first embodiment, the non-display portion 21 of a one-sheet picture is not transferred to the display devices 14-1 and 14-2. However, this part is not eliminated and exists as a part of an image of [(530,0) (1010,854)]. Therefore, when the non-display portion 21 is to be displayed in the complementary display mode, it can be displayed by the transfer area being slid to the right or left.

When a rightward slide instruction is given by the user from the key input section 15, the CPU 16 instructs the image control section 13 to perform display in a rightward slide mode. Then, in order for the non-display portion 21 to be displayed on the screen B side of the display device 14-2, the image control section 13 slides the whole image rightward by the size of the non-display portion 21 (50 dots) as shown in FIG. 9 (b), from a display state in the complementary display mode shown in FIG. 9 (a), and redraws the image on the display devices 14-1 and 14-2. As a result, an image corresponding to the non-display portion 21 is slid rightward and displayed on the screen B of the display device 14-2 (dashed rectangular part). When the image is slid rightward in this manner, a loss 25 is formed at the left end of the screen A of the display device 14-1 by the sliding amount. Thus, the image control section 13 displays a suitable image prepared by the system (black in the illustrated example).

Figure 10:
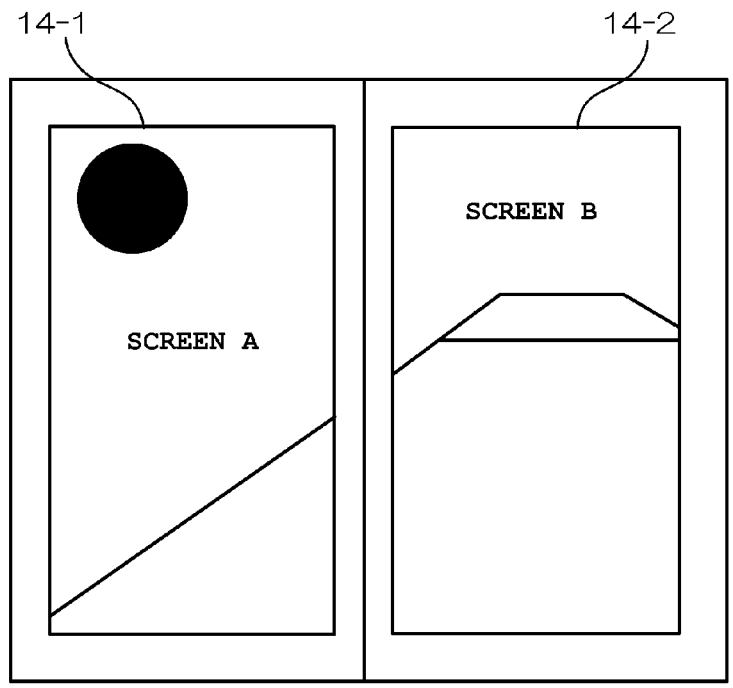
FIGS. 10 (a) and 10 (b) are schematic diagrams for explaining a multi-screen display method (left slide mode) according to the second embodiment.
Figure 10:
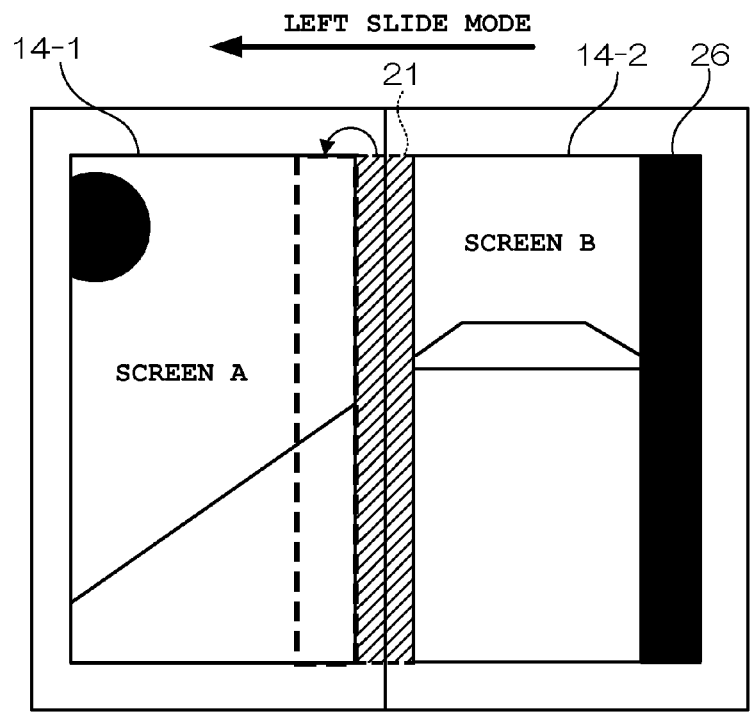
Figure 11:
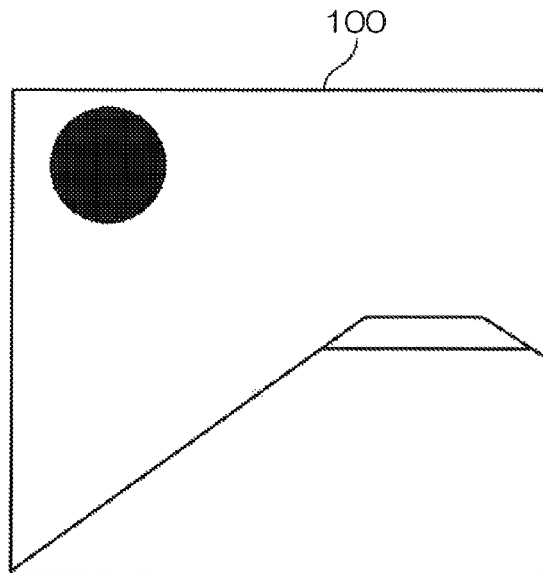
FIGS. 11 (a) and 11 (b) are schematic diagrams showing an example where a large one-sheet picture is displayed on two display devices.
Figure 11:
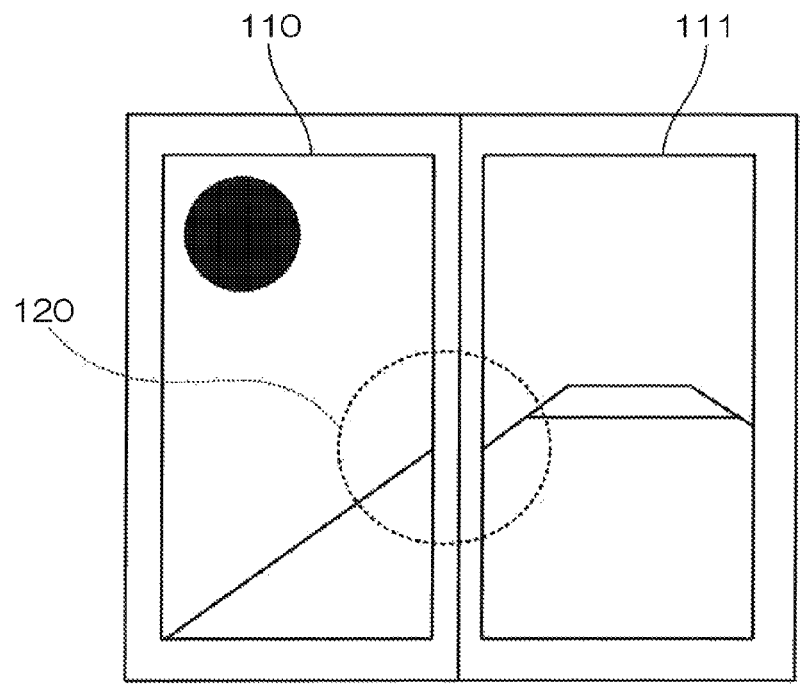

FIGS. 10(a) and 10(b) are schematic diagrams for explaining a multi-screen display method (left slide mode) according to the second embodiment. The above-described rightward slide mode is also applicable to leftward sliding. That is, when a left slide instruction is given by the user from the key input section 15, the CPU 16 instructs the image control section 13 to perform display in a leftward slide mode. Then, in order for the non-display portion 21 to be displayed on the screen A side of the display device 14-1, the image control section 13 slides the whole image leftward by the size of the non-display portion 21 (50 dots) as shown in FIG. 10(b), from a display state in the complementary display mode shown in FIG. 10(a), and redraws the image on the display devices 14-1 and 14-2. As a result, an image corresponding to the non-display portion 21 is slid leftward and displayed on the screen A of the display device 14-1 (dashed rectangular part). When the image is slid leftward in this manner, a loss 26 is formed at the right end of the screen B of the display device 14-2 by the sliding amount. Thus, the image control section 13 displays a suitable image prepared by the system (black in the illustrated example).

According to the above-described second embodiment, even in the complementary display mode where the non-display portion 21 is included and thereby information is partially lost, an entire image to be displayed can be slid to the right or left to display the non-display portion 21. As a result, a sense of incongruity due to discontinuity of a displayed image by frame parts can be reduced and a lack of display information can be prevented.

Note that, although rightward or leftward sliding has been described in the second embodiment, the sliding may also be upward or downward sliding in a case where the frame parts are extending in the transverse direction, such as a case where the display devices 14-1 and 14-2 have been vertically arranged or the mobile terminal 1 itself has been held in landscape orientation. Also, the rightward/leftward (upward/downward) slide operation in the above-described second embodiment is not limited to the instruction input from the key input section 15, and may be a touch operation on a touch panel provided on the display screens of the display devices 14-1 and 14-2. Moreover, the rightward/leftward sliding in the above-described second embodiment is not limited to the sliding by the size of the frame parts corresponding to 50 dots, and may be sliding by an amount equal to less than 50 dots or sliding by an amount equal to or more than 50 dots.

In the embodiments of the present invention, the present invention has been applied to a mobile phone as a terminal device. However, the present invention is not limited thereto, and can be widely applied to, for example, smartphones, PDAs (Personal Data Assistants), tablet terminals, multi-screen personal computers, digital book devices, and other electronic devices as long as they are electronic devices for which one large screen can be constituted by a plurality of display devices.

This application is based upon and claims the benefit of priority from the prior Japanese Patent Application No. 2012-276606 filed Dec. 19, 2012, the entire contents of which are incorporated herein by reference.

Hereinafter, Supplementary Notes describe the characteristics of the present invention.

The above-described embodiment can be partially or entirely described as in the following Supplementary Notes; however, the embodiment is not limited to these Supplementary Notes.

(Supplementary Note 1)

Figure 12:
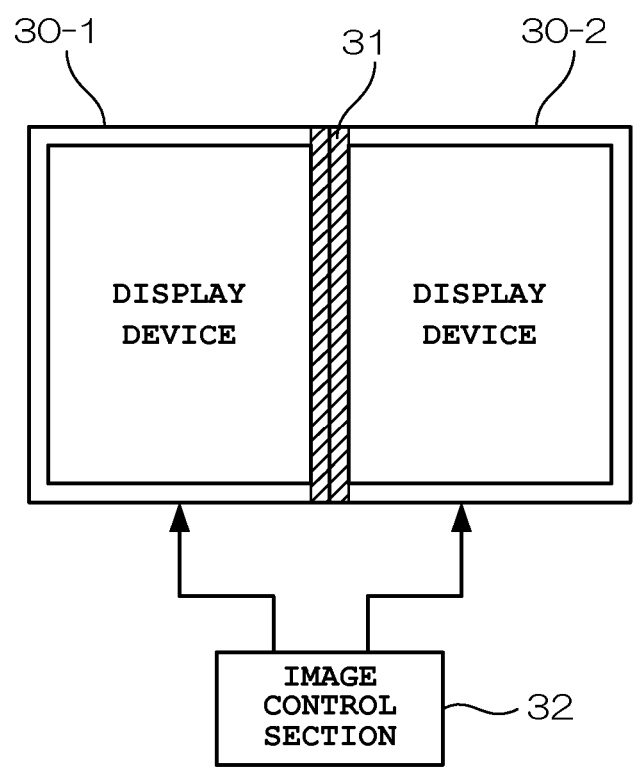
FIG. 12 is a block diagram showing the structure of Supplementary Note 1.

FIG. 12 is a block diagram of Supplementary Note 1. As shown in the diagram, the invention of Supplementary Note 1 is a mobile terminal comprising:

a plurality of display devices 30-1 and 30-2 which have display screens and frame parts surrounding the display screens and arranged such that the frame parts come in contact with each other; and an image control section 32 which switchably executes (i) a normal display mode where one display image is divided into display images according to the respective sizes of the display screens of the plurality of display devices 30-1 and 30-2, the display images acquired by the division are transferred to the plurality of display devices 30-1 and 30-2, respectively, and the one display image is displayed on the display screens of the plurality of display devices 30-1 and 30-2, and (ii) a complementary display mode where one display image is divided into display images according to the respective sizes of the display screens of the plurality of display devices 30-1 and 30-2 with an image corresponding to a non-display portion 31 formed by skipping the frame parts, the display images acquired by the division are transferred to the plurality of display devices 30-1 and 30-2, respectively, and the one display image is displayed on the display screens of the plurality of display devices 30-1 and 30-2.

(Supplementary Note 2)

Supplementary Note 2 is the mobile terminal according to Supplementary Note 1, wherein the image control section, when a slide instruction operation in a direction perpendicular to the frame parts is performed during display in the complementary display mode, slides the one display image including the image corresponding to the non-display portion formed by the frame parts in accordance with the slide instruction operation, and thereby displays the image corresponding to the non-display portion formed by the frame parts on the display screens of the plurality of display devices.

(Supplementary Note 3)

Supplementary Note 3 is the mobile terminal according to Supplementary Note 2, wherein the image control section slides the one display image including the image corresponding to the non-display portion formed by the frame parts by at least the size of the image corresponding to the non-display portion formed by the frame parts, when sliding the one display image in accordance with the slide instruction operation.

(Supplementary Note 4)

Supplementary Note 4 is a display control method for displaying one display image on a display screen constituted by a plurality of display devices having display screens and frame parts surrounding the display screens and arranged such that the frame parts come in contact with each other, comprising:

a normal display mode step of dividing the one display image into display images according to the respective sizes of the display screens of the plurality of display devices, transferring the display images acquired by the division to the plurality of display devices, respectively, and displaying the one display image on the display screens of the plurality of display devices;

a complementary display mode step of dividing the one display image into display images according to the respective sizes of the display screens of the plurality of display devices with an image corresponding to a non-display portion formed by skipping the frame parts, and transferring the display images acquired by the division to the plurality of display devices, respectively, and displaying the one display image on the display screens of the plurality of display devices; and a step of selectively switching between the normal display mode step and the complementary display mode step.

(Supplementary Note 5)

Supplementary Note 5 is a program characterized by a non-transitory computer-readable storage medium having a program stored thereon that is executable by a processor in a mobile terminal which displays one display image on a display screen constituted by a plurality of display devices having display screens and frame parts surrounding the display screens and arranged such that the frame parts come in contact with each other, the program being executable to cause the mobile terminal to actualize functions comprising:

a normal display mode function of dividing the one display image into display images according to the respective sizes of the display screens of the plurality of display devices, transferring the display images acquired by the division to the plurality of display devices, respectively, and displaying the one display image on the display screens of the plurality of display devices;

a complementary display mode function of dividing the one display image into display images according to the respective sizes of the display screens of the plurality of display devices with an image corresponding to a non-display portion formed by skipping the frame parts, transferring the display images acquired by the division to the plurality of display devices, respectively, and displaying the one display image on the display screens of the plurality of display devices; and a function of selectively switching between the normal display mode function and the complementary display mode function.

DESCRIPTION OF REFERENCE NUMERALS 1 mobile terminal
10 communication control section
11 ROM
12 RAM
13 image control section
14-1, 14-2 display device
15 key input section
16 CPU
21 non-display portion

What is claimed is:

1. A mobile terminal comprising:
a plurality of display devices comprising display screens and frame parts surrounding the display screens and arranged such that the frame parts come in contact with each other; and
an image control section which switchably executes:
  (i) a normal display mode in which one display image is divided into a first plurality of display images according to respective sizes of the display screens of the plurality of display devices, the first plurality of display images acquired by division are transferred to the plurality of display devices, respectively, and the one display image is displayed on the display screens of the plurality of display devices, and (ii) a complementary display mode in which the one display image is divided into a second plurality of display images according to the respective sizes of the display screens of the plurality of display devices with an image corresponding to a non-display portion formed by skipping the frame parts, the second plurality of display images acquired by division are transferred to the plurality of display devices, respectively, and the one display image is displayed on the display screens of the plurality of display devices;

wherein, when a slide instruction operation in a direction perpendicular to the frame parts is performed during the complementary display mode, the image control section:

shifts a position of the one display image in the direction of the slide instruction operation, by a predetermined distance, into a shifted position and divides the one display image in the shifted position into a third plurality of display images, divided at shifted division positions, and transfers the third plurality of display images to the display screens of the plurality of display devices.

2. The mobile terminal according to claim 1, wherein the shifted division positions are shifted by the image control section at least by a size of an image corresponding to the non-display portion formed by the contacted frame parts, when the slide instruction operation is performed.

3. A display control method for displaying one display image on a display screen comprising a plurality of display devices comprising display screens and frame parts surrounding the display screens and arranged such that the frame parts come in contact with each other, the method comprising:

a normal display mode step of dividing the one display image into a first plurality of display images according to respective sizes of the display screens of the plurality of display devices, transferring the first plurality of display images acquired by division to the plurality of display devices, respectively, and displaying the one display image on the display screens of the plurality of display devices;

a complementary display mode step of dividing the one display image into a second plurality of display images according to the respective sizes of the display screens of the plurality of display devices with an image corresponding to a non-display portion formed by skipping the frame parts, and transferring the second plurality of display images acquired by division to the plurality of display devices, respectively, and displaying the one display image on the display screens of the plurality of display devices;

a step of selectively switching between the normal display mode step and the complementary display mode step; and when a slide instruction operation in a direction perpendicular to the frame parts is performed during the complementary display mode:

shifting a position of the one display image in the direction of the slide instruction operation, by a predetermined distance, and dividing the one display image in the shifted position into a third plurality of display images, divided at shifted division positions, and transferring the third plurality of display images to the display screens of the plurality of display devices.

4. A non-transitory computer-readable storage medium having a program stored thereon that is executable by a processor in a mobile terminal which displays one display image on a display screen comprising a plurality of display devices comprising display screens and frame parts surrounding the display screens and arranged such that the frame parts come in contact with each other, the program being executable to cause the mobile terminal to actualize functions comprising:

a normal display mode function of dividing the one display image into a first plurality of display images according to respective sizes of the display screens of the plurality of display devices, transferring the first plurality of display images acquired by division to the plurality of display devices, respectively, and displaying the one display image on the display screens of the plurality of display devices;

a complementary display mode function of dividing the one display image into a second plurality of display images according to the respective sizes of the display screens of the plurality of display devices with an image corresponding to a non-display portion formed by skipping the frame parts, transferring the second plurality of display images acquired by division to the plurality of display devices, respectively, and displaying the one display image on the display screens of the plurality of display devices;

a function of selectively switching between the normal display mode function and the complementary display mode function; and a slide instruction operation function of, when a slide instruction operation in a direction perpendicular to the frame parts is performed during the complementary display mode:

shifting a position of the one display image in the direction of the slide instruction operation, by a predetermined distance, and dividing the one display image in the shifted position into a third plurality of display images, divided at shifted division positions, and transferring the third plurality of display images to the display screens of the plurality of display devices.

* * * * *